US012652558B2

(12) United States Patent
Chen et al.

(10) Patent No.: US 12,652,558 B2
(45) Date of Patent: Jun. 9, 2026

(54) MEASUREMENT PROCESSING METHOD, INDICATION INFORMATION SENDING METHOD, TERMINAL, AND NETWORK DEVICE

(71) Applicant: VIVO MOBILE COMMUNICATION CO., LTD., Guangdong (CN)

(72) Inventors: Li Chen, Guangdong (CN); Xueming Pan, Guangdong (CN); Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 424 days.

(21) Appl. No.: 17/724,766

(22) Filed: Apr. 20, 2022

(65) Prior Publication Data

US 2022/0248244 A1     Aug. 4, 2022

Related U.S. Application Data

(63) Continuation of application No. PCT/CN2020/123091, filed on Oct. 23, 2020.

(30) Foreign Application Priority Data

Oct. 23, 2019    (CN) .......................... 201911014317.X

(51) Int. Cl.
| | | |
|---|---|---|
| *G01R 31/08* | (2020.01) | |
| *G06F 11/00* | (2006.01) | |
(Continued)

(52) U.S. Cl.
CPC .................................... *H04W 24/08* (2013.01)

(58) Field of Classification Search
CPC . H04W 24/08; H04W 52/0235; H04W 24/10; H04W 76/28; H04W 24/02; H04B 7/0695; Y02D 30/70
See application file for complete search history.

(56) References Cited

U.S. PATENT DOCUMENTS

| | | | |
|---|---|---|---|
| 2013/0053082 A1* | 2/2013 | Chai ..................... | H04B 17/391 |
| | | | 455/67.11 |
| 2014/0286176 A1* | 9/2014 | Ro ..................... | H04W 36/0094 |
| | | | 370/242 |
(Continued)

FOREIGN PATENT DOCUMENTS

| | | |
|---|---|---|
| CN | 101014169 A | 8/2007 |
| CN | 102595478 A | 7/2012 |
(Continued)

OTHER PUBLICATIONS

3GPP TSG RAN WG1 Meeting #96; R1-1903805; Athens, Greece, Feb. 25-Mar. 1, 2019; Source: Vivo; Title: Summary #5 of UE power Consumption Reduction in RRM Measurements (Year: 2019).*

(Continued)

*Primary Examiner* — Edan Orgad
*Assistant Examiner* — Hidayat Dabiri
(74) *Attorney, Agent, or Firm* — BROOKS KUSHMAN P.C.

(57) ABSTRACT

Embodiments of the present invention provide a measurement processing method, an indication information sending method, a terminal, and a network device. The method includes: receiving an indication message, where the indication message is used to indicate information about adjustment of a measurement, and the measurement includes at least one of an RLM measurement or a BFD measurement; and determining, based on the information, whether to adjust a measurement state of the measurement.

16 Claims, 6 Drawing Sheets

(51) Int. Cl.

| | | |
|---|---|---|
| *G08C 15/00* | (2006.01) | |
| *H04J 1/16* | (2006.01) | |
| *H04J 3/14* | (2006.01) | |
| *H04L 1/00* | (2006.01) | |
| *H04W 24/08* | (2009.01) | |

(56) References Cited

U.S. PATENT DOCUMENTS

| | | | |
|---|---|---|---|
| 2015/0163687 A1 | 6/2015 | Lee et al. | |
| 2020/0112893 A1* | 4/2020 | Li | H04W 76/28 |
| 2020/0128467 A1* | 4/2020 | Gao | H04W 36/0088 |
| 2020/0229092 A1* | 7/2020 | Wu | H04B 7/0413 |
| 2020/0359241 A1* | 11/2020 | Siomina | H04W 24/08 |
| 2021/0112431 A1* | 4/2021 | Kazmi | H04W 76/18 |
| 2024/0306057 A1* | 9/2024 | Thangarasa | H04W 36/0085 |
| 2025/0081019 A1* | 3/2025 | Li | H04W 24/08 |
| 2025/0254551 A1* | 8/2025 | Liu | H04W 24/08 |

FOREIGN PATENT DOCUMENTS

| | | | |
|---|---|---|---|
| CN | 104602265 A | 5/2015 | |
| CN | 109587707 A | 4/2019 | |
| CN | 109802814 A | 5/2019 | |
| WO | 2011134437 A1 | 11/2011 | |
| WO | 2018174806 A1 | 9/2018 | |
| WO | 2019097457 A1 | 5/2019 | |

OTHER PUBLICATIONS

1st Chinese Office Action, English Translation.
2nd Chinese Office Action, English Translation.
International Search Report and Written Opinion, English Translation.

CN101014169A, English Abstract and Machine Translation.
CN102595478A, English Abstract and Machine Translation.
CN104602265A, English Abstract and Machine Translation.
CN109587707A, English Abstract and Machine Translation.
CN109802814A, English Abstract and Machine Translation.
WO2011134437A1, English Abstract and U.S. Equivalent U.S. Pub. No. 2013/0053082.
First Office Action for Chinese Application No. 201911014317.X, dated Jan. 6, 2022, 6 Pages.
International Search Report and Written Opinion for Application No. PCT/CN2020/123091, dated Nov. 25, 2020, 8 Pages.
Second Office Action for Chinese Application No. 201911014317.X, dated Jun. 20, 2022, 5 Pages.
Extended European Search Report for Application No. 20878205.2-1216, dated Jan. 4, 2023, 14 pages.
Huawei et al: "UE power consumption reduction techniques" ,3GPP Draft; RI-154332, Beijing, China, Aug. 23, 2015, 4 pages.
VIVO: "Correction for RLM and BFD configuration", 3GPP Draft; R2-1807610, Busan, Korea, May 20, 2018, 7 pages.
VIVO: "UE Power Consumption Reduction in RRM Measurement", 3GPP Draft; R2-1912335, Chongqing, China, Oct. 4, 2019, 8 pages.
"Views on Further enhanced NR UE power saving in Rel-17", 3GPP DRAFT; RP-191901, Newport Beach, USA, Sep. 9, 2019, 4 pages.
QUALCOMM: "NR-based Access to Unlicensed Spectrum", 3GPP Draft; RP-192269, New Port Beach, USA, Sep. 18, 2019, 20 pages.
Vivo. Summary#5 of UE power Consumption Reduction in RRM Measurements. 3GPP TSG RAN WG1 Meeting #96. R1-1903805. Online. Feb.-Mar. 2019. 59 pages.
Second European Office Action for European Patent Application No. 20878205.2 mailed May 8, 2025. 7 pages.

\* cited by examiner

Network device

Terminal

MEASUREMENT PROCESSING METHOD, INDICATION INFORMATION SENDING METHOD, TERMINAL, AND NETWORK DEVICE

CROSS-REFERENCE TO RELATED APPLICATIONS

This application is a continuation application of International Application No. PCT/CN2020/123091 filed on Oct. 23, 2020, which claims priority to Chinese Patent Application No. 201911014317.X, filed on Oct. 23, 2019, which are incorporated herein by reference in their entireties.

TECHNICAL FIELD

The present invention relates to the field of communications technologies, and in particular, to a measurement processing method, an indication information sending method, a terminal, and a network device.

BACKGROUND

To ensure communication reliability of terminals, terminals usually need to perform some measurements, for example, performing radio link monitoring (Radio Link Monitoring, RLM) measurement to ensure radio link reliability, and performing beam failure detection (Beam Failure Detection, BFD) measurement to ensure beam reliability. In conventional technologies, a terminal usually stays in one measurement state, which means that the measurement state of the terminal is not adjustable, resulting in a relatively poor measurement capability of the terminal.

SUMMARY

Embodiments of the present invention provide a measurement processing method, an indication information sending method, a terminal, and a network device.

According to a first aspect, an embodiment of the present invention provides a measurement processing method, applied to a terminal and including:

receiving an indication message, where the indication message is used to indicate information about adjustment of a measurement, and the measurement includes at least one of an RLM measurement or a BFD measurement; and determining, based on the information, whether to adjust a measurement state of the measurement.

According to a second aspect, an embodiment of the present invention provides an indication information sending method, applied to a network device and including:

sending an indication message, where the indication message is used to indicate information about adjustment of a measurement, the measurement includes at least one of an RLM measurement or a BFD measurement, and the information is used to cause a terminal to determine whether to adjust a measurement state of the measurement.

According to a third aspect, an embodiment of the present invention provides a terminal, including:

a receiving module, configured to receive an indication message, where the indication message is used to indicate information about adjustment of a measurement, and the measurement includes at least one of an RLM measurement or a BFD measurement; and a determining module, configured to determine, based on the information, whether to adjust a measurement state of the measurement.

According to a fourth aspect, an embodiment of the present invention provides a network device, including:

a sending module, configured to send an indication message, where the indication message is used to indicate information about adjustment of a measurement, the measurement includes at least one of an RLM measurement or a BFD measurement, and the information is used to cause a terminal to determine whether to adjust a measurement state of the measurement.

According to a fifth aspect, an embodiment of the present invention provides a terminal, including a memory, a processor, and a program stored in the memory and capable of running on the processor, where when the program is executed by the processor, steps of the measurement processing method provided in the embodiments of the present invention are implemented.

According to a sixth aspect, an embodiment of the present invention provides a network device, including a memory, a processor, and a program stored in the memory and capable of running on the processor, where when the program is executed by the processor, steps of the indication information sending method provided in the embodiments of the present invention are implemented.

According to a seventh aspect, an embodiment of the present invention provides a computer-readable storage medium, where the computer-readable storage medium stores a computer program, and when the computer program is executed by a processor, steps of the measurement processing method provided in the embodiments of the present invention are implemented, or steps of the indication information sending method provided in the embodiments of the present invention are implemented.

In the embodiments of the present invention, the indication message is received, where the indication message is used to indicate the information about the measurement adjustment, and the measurement includes at least one of the RLM measurement or the BFD measurement; and whether to adjust the measurement state of the measurement is determined based on the information.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: only A, only B, or both A and B.

In the embodiments of the present invention, terms such as "an example" or "for example" are used to represent an example, illustration, or explanation. Any embodiment or design scheme described by "an example" or "for example" in the embodiments of the present invention should not be construed as being more preferred or advantageous than other embodiments or design schemes. To be precise, the terms such as "an example" or "for example" are intended to present a related concept in a specific manner.

The following describes the embodiments of the present invention with reference to the accompanying drawings. The measurement processing method, indication information sending method, terminal, and network device according to the embodiments of the present invention may be applied to a wireless communications system. The wireless communications system may be a new radio (New Radio, NR) system, or another system, for example, an evolved long term evolution (Evolved Long Term Evolution, eLTE) system, a long term evolution (Long Term Evolution, LTE) system, or a later evolved communications system.

Figure 1:
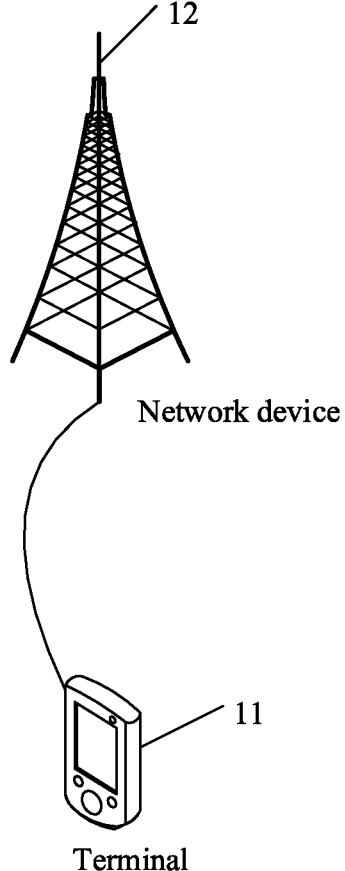
FIG. 1 is a structural diagram of a network system to which an embodiment of the present invention may be applied.

FIG. 1 is a structural diagram of a network system to which an embodiment of the present invention may be applied. As shown in FIG. 1, the network system includes a terminal 11 and a network device 12. The terminal 11 may be a user terminal (User Equipment, UE) or other terminal-side devices, for example, a mobile phone, a tablet personal computer (Tablet Personal Computer), a laptop computer (Laptop Computer), a personal digital assistant (personal digital assistant, PDA), a mobile Internet device (Mobile Internet Device, MID), a wearable device (Wearable Device), or a robot. It should be noted that a specific type of the terminal 11 is not limited in this embodiment of the present invention. The network device 12 may be a 4G base station, or a 5G base station, or a base station of a later release, or a base station in another communications system, and may be referred to as a NodeB, or an evolved NodeB, or a transmission and reception point (Transmission and Reception Point, TRP), or an access point (Access Point, AP), or other terms in the art. As long as a same technical effect is achieved, the network device is not limited to a specific technical term. In addition, the network device 12 may be a master node (Master Node, MN) or a secondary node (Secondary Node, SN). It should be noted that the 5G base station is used merely as an example in the embodiments of the present invention, rather than to limit a specific type of the network device.

Figure 2:
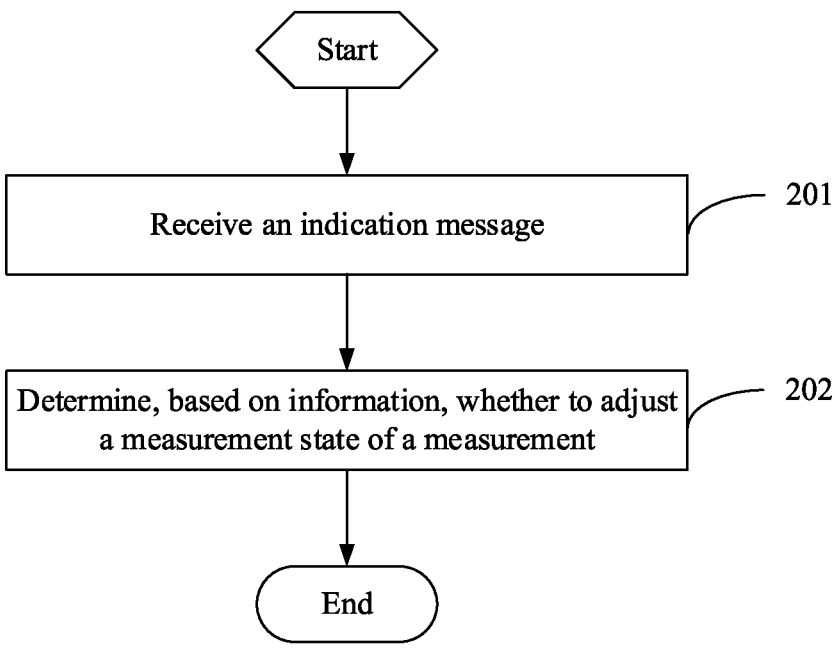
FIG. 2 is a flowchart of a measurement processing method according to an embodiment of the present invention.

FIG. 2 is a flowchart of a measurement processing method according to an embodiment of the present invention. The method is applied to a terminal. As shown in FIG. 2, the method includes the following steps.

Step 201: Receive an indication message, where the indication message is used to indicate information about adjustment of a measurement, and the measurement includes at least one of an RLM measurement or a BFD measurement.

The indication message may be sent by a network device, and the measurement may be the RLM measurement or the BFD measurement, or may be the RLM measurement and the BFD measurement.

It should be noted that, in this embodiment of the present invention, the RLM measurement may also be referred to as RLM monitoring, and the BFD measurement may also be referred to as BFD monitoring.

In addition, the measurement may be a measurement in a discontinuous reception (Discontinuous reception, DRX) cycle.

The information may be information related to a measurement state of the measurement to be adjusted by the terminal, for example, indication information indicating whether a cell supports one or more measurement states, so that the terminal can determine whether to make an adjustment from an original measurement state to one of these measurement states; or the information may be a measurement adjustment parameter, so that the terminal can determine, based on the measurement, whether to adjust the measurement state, or the like.

Step 202: Determine, based on the information, whether to adjust a measurement state of the measurement.

The determining, based on the information, whether to adjust a measurement state of the measurement may be: in a case that the information indicates the terminal to adjust the measurement state, determining to adjust the measurement state of the measurement; or the determining, based on the information, whether to adjust a measurement state of the measurement may be: in a case that the information indicates that one or more measurement states are supported, the terminal determining, by also considering sensor (Sensor) information or cell information of the terminal, whether to adjust the measurement state to one measurement state of the indicated one or more measurement states; or the determining, based on the information, whether to adjust a measurement state of the measurement may be: in a case that the information indicates an adjustment parameter, the terminal determining, based on the adjustment parameter, to adjust the measurement state of the measurement. Specifically, whether to adjust the measurement state may be determined based on only the foregoing information, or whether to adjust the measurement state may be determined based on the information in combination with other information of the terminal.

In this embodiment of the present invention, the foregoing steps can be performed to support the terminal in adjusting the measurement state, thereby improving a measurement capability of the terminal, further reducing power consumption of the terminal during measurement relaxation, and improving the measurement capability of the terminal during measurement enhancement.

It should also be noted that, if determining to adjust the measurement state of the measurement, the method further includes adjusting the measurement state of the measurement. For example, an adjustment is made from a measurement state of a measurement with high energy consumption to a measurement state of a measurement with low energy consumption, to achieve an effect of reducing the power consumption of the terminal, that is, achieve an objective of saving power.

In an optional implementation, the indication message includes system information or an advance indication message.

The system information may be a system information block (System Information Block, SIB). The advance indication message may be at least one of the following: a wake-up signal (wake-up-signal, WUS), a go-to-sleep (Go-to-sleep, GTS) signal, and downlink control information (Downlink Control Information, DCI), where the DCI includes scheduling DCI or other newly designed DCI.

In an optional implementation, the adjusting a measurement state of the measurement includes making an adjustment between any two of the following measurement states:

a first measurement state, a second measurement state, and a third measurement state, where the first measurement state is measurement relaxation, the second measurement state is normal measurement, and the third measurement state is measurement enhancement.

Energy consumption of the measurement in the first measurement state may be lower than energy consumption of the measurement in the second measurement state, and energy consumption of the measurement in the second measurement state may be lower than energy consumption of the measurement in the third measurement state. The energy consumption of the measurement may be power consumption of the terminal when the measurement is being performed.

For example, it is determined to make an adjustment from the first measurement state to the second measurement state, or it is determined to make an adjustment from the second measurement state to the first measurement state, or it is determined to make an adjustment from the third measurement state to the second measurement state, or it is determined to make an adjustment from the third measurement state to the first measurement state, or it is determined to make an adjustment from the first measurement state to the third measurement state.

That the first measurement state is measurement relaxation may mean that the first measurement state is a state of measurement relaxation performed on a basis of the second measurement state. That the third measurement state is measurement enhancement may mean that the third measurement state is a state of measurement enhancement performed on a basis of the second measurement state.

Because the first measurement state is measurement relaxation, the first measurement state may be referred to as a measurement relaxation state (measurement relaxation for short). Because the second measurement state is normal measurement, the second measurement state may be referred to as a normal measurement state (normal measurement for short). It should be noted that, in this embodiment of the present invention, the normal measurement may refer to a default measurement state or a preconfigured state. Because the third measurement state is measurement enhancement, the third measurement state may be referred to as a measurement enhancement state (measurement enhancement for short).

Optionally, the first measurement state satisfies at least one of the following:

a measurement period is longer than a measurement period of the second measurement state;

a quantity of measurement samples within a first time is less than a quantity of measurement samples in the second measurement state;

a measurement indication gap is longer than a measurement indication gap of the second measurement state;

the measurement is not performed within a second time, or a quantity of measurements within the second time is less than a quantity of measurements in the second measurement state;

no upper layer indication (Upper layer indication) of the measurement is provided within a third time, or a quantity of upper layer indications of the measurement within the third time is less than a quantity of upper layer indications of the measurement in the second measurement state;

a quantity of reference signals of the measurement is less than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing (Subcarrier spacing, SCS).

The measurement period may be a measurement period of the measurement in at least one of layer 1 (L1), layer 2 (L2), and layer 3 (L3), and the quantity of measurement samples may be a quantity of measurement samples (sample). Because the measurement period is longer than the measurement period of the second measurement state, and the quantity of measurement samples is less than the quantity of measurement samples in the second measurement state, the measurement (for example, the RLM/BFD measurement) relaxation can be implemented in time domain, that is, the L1 measurement period of the measurement is extended or the quantity of measurement samples (sample) is reduced to save power.

The measurement indication gap may be a layer-2 or layer-3 measurement indication interval. Because the measurement indication gap is longer than the measurement indication gap of the second measurement state, the measurement (for example, the RLM/BFD measurement) relaxation can be implemented in time domain, that is, the L2/L3 measurement indication gap is extended to save power.

The first time, the second time, and the third time may be same or different time periods, or time periods with same or different time lengths. Because the quantity of measurement samples within the first time is less than the quantity of measurement samples in the second measurement state, the quantity of measurement samples in a time period can be reduced to save power.

Because the measurement is not performed within the second time, or the quantity of measurements within the second time is less than the quantity of measurements in the second measurement state, the measurement (for example, the RLM/BFD measurement) is not performed or the measurement is reduced in a time period to save power.

Because no upper layer indication of the measurement is provided within the third time, or the quantity of upper layer indications of the measurement within the third time is less than the quantity of upper layer indications of the measurement in the second measurement state, no upper layer indication (for example, no RLM/BFD upper layer indication) is provided or the upper layer indication (for example, the RLM/BFD upper layer indication) can be reduced in a time period to save power.

Because the quantity of reference signals of the measurement is less than the quantity of reference signals of the measurement in the second measurement state, the quantity of reference signals of the measurement (for example, the RLM/BFD measurement) can be reduced to save power.

The difference in the period of the reference signal may be that the period of the reference signal of the measurement in the first measurement state is greater than the period of the reference signal of the measurement in the second measurement state, and the difference in the SCS may be that the SCS of the reference signal of the measurement in the first measurement state is greater than the SCS of the reference signal of the measurement in the second measurement state. In this way, power can be saved.

In this implementation, a plurality of manners are provided, so that energy consumption of the measurement in the first measurement state is lower than energy consumption of the measurement in the second measurement state. Certainly, this embodiment of the present invention is not limited to the foregoing manners.

Optionally, the third measurement state satisfies at least one of the following:

a measurement period is shorter than a measurement period of the second measurement state;

a quantity of measurement samples within a fourth time is greater than a quantity of measurement samples in the second measurement state;

a measurement indication gap is shorter than a measurement indication gap of the second measurement state;

the measurement is performed within a fifth time, or a quantity of measurements within the fifth time is greater than a quantity of measurements in the second measurement state;

an upper layer indication of the measurement is provided within a sixth time, or a quantity of upper layer indications of the measurement within the sixth time is greater than a quantity of upper layer indications of the measurement in the second measurement state;

a quantity of reference signals of the measurement is greater than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

For descriptions about the third measurement state, reference may be made to the descriptions about the second measurement state. Details are not described herein again.

In an optional implementation, the information is used to represent at least one of the following:

a measurement state parameter, a measurement state supported by a cell, and a cell type; or the information is used to represent at least one of the following:

a measurement state parameter, whether a cell supports the first measurement state, whether a cell supports the third measurement state, and a cell type.

That the information is used to represent at least one of the foregoing may be that the information includes content of at least one of the foregoing.

The measurement state parameter may be a parameter of one or more of the first measurement state, the second measurement state, and the third measurement state, for example, a parameter of the first measurement state. In addition, the measurement state parameter herein may be a parameter related to the measurement, for example, at least one of a timer and a counter related to the measurement, for example, a parameter of at least one of a timer T310, a timer T311, a counter N310, and a counter N311 for determining a beam failure or a radio link failure. Further, the measurement parameter may be a measurement state parameter of a current cell.

The measurement state supported by the cell may be a measurement state supported by the current cell. Further, the measurement state supported by the cell may be that the cell supports one or more of the first measurement state, the second measurement state, and the third measurement state, for example, the cell supports the first measurement state.

The cell type may be a type of the current cell, for example, an indoor cell, an outdoor macro cell, or an outdoor micro cell.

In this implementation, the information includes at least one of the foregoing, so that the terminal can determine, based on the information, whether to adjust the measurement state of the measurement. If the information includes that the current cell supports the first measurement state, the terminal may determine to adjust the measurement state to the first measurement state. If the information includes the cell type, and the cell type is a cell type that supports the first measurement state or the third measurement state, the terminal may determine to adjust the measurement state to the first measurement state or the third measurement state. If the information includes the parameter of the first measurement state, the terminal may determine to adjust the measurement state to the first measurement state.

Further, the indication message may be a broadcast indication message. For example, the indication message includes a SIB message.

In an optional implementation, the information is used to represent at least one of the following:

a measurement state parameter, a supported measurement state, a first indication, a second indication, and a third indication; or the information is used to represent at least one of the following:

a measurement state parameter, whether the first measurement state is supported, whether the third measurement state is supported, a first indication, a second indication, and a third indication, where the first indication is used to indicate skipping the measurement corresponding to at least one period, the second indication is used to indicate performing the measurement in at least one period after the indication message, and the period includes a measurement period, a discontinuous reception DRX cycle, or an upper layer indication period; and the third indication is used to indicate skipping at least one upper layer indication period.

The measurement state parameter may be a parameter of one or more of the first measurement state, the second measurement state, and the third measurement state, for example, a parameter of the first measurement state. In addition, the measurement state parameter herein may be a parameter related to the measurement, for example, at least one of a timer and a counter related to the measurement, for example, a parameter of at least one of a timer T310, a timer T311, a counter N310, and a counter N311 for determining a beam failure or a radio link failure. Further, the measurement parameter may be a measurement state parameter of the terminal.

The supported measurement state may be a measurement state supported by the terminal or the network device. Further, the supported measurement state may be that the terminal or the network device supports one or more of the first measurement state, the second measurement state, and the third measurement state. For example, the terminal or the network device supports the first measurement state.

That the first indication is used to indicate skipping the measurement corresponding to at least one period may be: the information is used to indicate skipping the measurement (for example, the RLM/BFD measurement) corresponding to one or more measurement periods (for example, RLM/BFD measurement periods) or DRX cycles, or used to indicate not performing the measurement (for example, the RLM/BFD measurement) in subsequent several measurement periods (for example, RLM/BFD measurement periods) or upper layer indication periods or DRX cycles to save power.

That the second indication is used to indicate performing the measurement in at least one period may be that the information is used to indicate performing the measurement (for example, the RLM/BFD measurement) in subsequent several measurement periods (for example, RLM/BFD measurement periods) or upper layer indication periods or DRX cycles.

That the third indication is used to indicate skipping at least one upper layer indication period may be that the information is used to skip one or more upper layer indication periods, that is, no upper layer indication is provided in the one or more upper layer indication periods, but the measurement may be performed, to save power.

In this implementation, the information includes at least one of the foregoing, so that the terminal can determine, based on the information, whether to adjust the measurement state of the measurement, and that the terminal can perform the measurement based on the information.

In addition, in the foregoing implementation, the indication message may be sent by using a dedicated message of the terminal. For example, the indication message is included in the advance indication message.

It should be noted that, in this embodiment of the present invention, the information is not limited to the foregoing content. For example, the information may include parameters configured by a network device, such as related parameters for determining a radio link failure or a beam failure. The terminal determines, based on the parameters, whether to adjust the measurement state of the measurement.

In an optional implementation, the information includes one of the following:

information configured by a network device for each terminal;

information configured by a network device for each cell;

information configured by a network device for each frequency, each carrier, each frequency band, or each bandwidth part (Bandwidth part, BWP);

information configured by a network device for each frequency, each carrier, each frequency band, or each bandwidth part of each terminal; and information configured by a network device for each beam.

The information configured by the network device for each terminal may be a per-UE configuration, that is, a network configures, for each terminal, separate information for indicating the measurement adjustment.

The information configured by the network device for each cell may be a per-cell configuration, that is, the information configured by the network within a cell range and used for indicating the measurement adjustment is consistent, so that the terminal applies the information within the cell range.

The information configured by the network device for each frequency, each carrier, each frequency band, or each bandwidth part may be information configured for each frequency separately and used for indicating the measurement adjustment, or information configured for each carrier separately and used for indicating the measurement adjustment, or information configured for each frequency band separately and used for indicating the measurement adjustment, or information configured for each carrier separately and used for indicating the measurement adjustment, or information configured for each bandwidth part separately and used for indicating the measurement adjustment. For example, the configuration is performed per-frequency/carrier/band/BWP, that is, information configured by the network within a frequency/carrier/band/BWP range and used for indicating the measurement adjustment is consistent.

The information configured by the network device for each frequency, each carrier, each frequency band, or each bandwidth part of each terminal may be information configured for each frequency of each terminal separately and used for indicating the measurement adjustment, or information configured for each carrier of each terminal separately and used for indicating the measurement adjustment, or information configured for each frequency band of each terminal separately and used for indicating the measurement adjustment, or information configured for each bandwidth part of each terminal separately and used for indicating the measurement adjustment. For example, the configuration is performed per-UE and per-frequency/carrier/band/BWP, that is, information configured by the network for each terminal within a frequency/carrier/band/BWP range and used for indicating the measurement adjustment is consistent.

The information configured by the network device for each beam may be information configured for each beam separately and used for indicating the measurement adjustment, that is, a per-beam configuration, so that the terminal applies corresponding information during a measurement corresponding to the beam.

It should be noted that, for content represented by the information configured in each case, reference may be made to the foregoing implementation of the content represented by the information. Details are not described herein again.

In an optional implementation, the indication message indicates the information explicitly or implicitly.

Indicating the information explicitly may be indicating the information by using several bits. For example, the indication message explicitly indicates the information by using at least one bit.

Indicating implicitly may be indicating implicitly by using other message content. For example, the indication message implicitly indicates the information by indicating skipping physical downlink control channel (Physical downlink control channel, PDCCH) monitoring or not starting a DRX-on duration timer, and specifically may implicitly indicate at least one of the foregoing included in the information, so that signaling overheads can be reduced.

In an optional implementation, the determining, based on the information, whether to adjust a measurement state of the measurement includes:

determining, based on the information and a parameter of the terminal, whether to adjust the measurement state of the measurement; or determining, based on the information, a parameter of the terminal, and a cell type, whether to adjust the measurement state of the measurement; or determining, based on the information and a cell type, whether to adjust the measurement state of the measurement, where the parameter of the terminal includes at least one of a moving speed and a location of the terminal.

A correspondence exists between the parameter of the terminal and the measurement state of the measurement, so that a suitable measurement state of the terminal can be determined based on the correspondence. A correspondence exists between the cell type and the measurement state of the measurement, so that a suitable measurement state can be determined based on the cell type. The correspondence herein may be preconfigured, or configured by the network device for the terminal, or prescribed in a protocol, or the like. For example, for an indoor cell, RLM/BFD measurement relaxation or measurement enhancement is performed, or conversely normal measurement, or a combination thereof is performed.

The determining, based on the information and a parameter of the terminal, whether to adjust the measurement state of the measurement may be: the information indicates that some measurement states are supported, and the terminal determines, based on the parameter of the terminal, which measurement state is currently suitable for the terminal, to determine whether to adjust the measurement state; or the information indicates some measurement state parameters, and the terminal determines, based on the parameter of the terminal, which measurement state is currently suitable for the terminal, to determine whether to adjust the measurement state, or the like.

The determining, based on the information, a parameter of the terminal, and a cell type, whether to adjust the measurement state of the measurement may be: the terminal determines, based on the information and the cell type, the measurement state supported by the current cell, and then determines, based on the parameter of the terminal, which measurement state is currently suitable for the terminal, to determine whether to adjust the measurement state; or the information indicates that some measurement states are supported, and the terminal determines, based on the parameter of the terminal and the cell type, which measurement state is currently suitable for the terminal, to determine whether to adjust the measurement state; or the information indicates some measurement state parameters, and the terminal determines, based on the parameter of the terminal and the cell type, which measurement state is currently suitable for the terminal, to determine whether to adjust the measurement state, or the like.

The determining, based on the information and a cell type, whether to adjust the measurement state of the measurement may be: the terminal determines, based on the information and the cell type, the measurement state supported by the current cell, and then determines whether to adjust the measurement state to the measurement state supported by the current cell. For example, for an indoor cell, an adjustment may be made to the first measurement state (for example, RLM/BFD measurement relaxation), or conversely to the second measurement state (for example, normal measurement) or the third measurement state (for example, measurement enhancement).

It should be noted that, in the foregoing manner, at least one of the moving speed and the location of the terminal may be determined based on a threshold configured by the network device and a measurement result of the terminal. For example, in a case of a cell center or a low moving speed, the terminal may adjust the measurement state to the first measurement state (for example, RLM/BFD measurement relaxation), or conversely may adjust the measurement state to the second measurement state (for example, normal measurement) or the third measurement state (for example, the enhanced measurement). Certainly, at least one of the moving speed and the location of the terminal may also be determined based on a preset time.

In this implementation, a combination of the information, the parameter of the terminal, and the cell type is used to determine whether to adjust the measurement state, so that the determined result is more accurate and more compliant with an actual situation of the terminal, to further improve measurement performance of the terminal.

Further, whether to adjust the measurement may be determined based on a threshold configured by the network device, where the threshold may be configured by using the foregoing information.

In a solution, the information includes a measurement adjustment determining threshold, and whether to perform an RLM measurement adjustment may be determined based on the following rule:

1. If the measurement result is higher than or equal to a first threshold, the terminal performs RLM/BFD measurement relaxation, or if the measurement result is lower than or equal to a second threshold, the terminal performs normal RLM/BFD measurement;

2. if the measurement result is higher than or equal to a first threshold, the terminal performs normal RLM/BFD measurement, or if the measurement result is lower than or equal to a second threshold, the terminal performs RLM/BFD measurement enhancement; or 3. if the measurement result is higher than or equal to a first threshold, the terminal performs RLM/BFD measurement relaxation, or if the measurement result is lower than or equal to a second threshold, the terminal performs RLM/BFD measurement enhancement.

The first threshold or the second threshold in the foregoing 1, 2, and 3 may be the same or different, and may be specifically configured by the network.

Further, the first threshold and/or the second threshold may be the same as or different from an S-measure threshold defined in a protocol (threshold used in a connected state and an idle state to determine whether to measure neighboring cells or other frequencies).

In another solution, the information includes an RLM/BFD measurement adjustment determining threshold and a preset time, and whether to perform an RLM/BFD measurement adjustment may be determined based on the following rule:

Method 1:

1. If the measurement result is always higher than or equal to a first threshold within a preset time 1, the terminal performs RLM/BFD measurement relaxation, or if the measurement result is always lower than or equal to a second threshold within a preset time 2, the terminal performs normal RLM/BFD measurement;

2. if the measurement result is always higher than or equal to a first threshold within a preset time 1, the terminal performs normal RLM/BFD measurement, or if the measurement result is always lower than or equal to a second threshold within a preset time 2, the terminal performs RLM/BFD measurement enhancement; or 3. if the measurement result is always higher than or equal to a first threshold within a preset time 1, the terminal performs RLM/BFD measurement relaxation, or if the measurement result is always lower than or equal to a second threshold within a preset time 2, the terminal performs RLM/BFD measurement enhancement.

Method 2:

1. If the measurement result is higher than or equal to a first threshold, and no measurement result is lower than a second threshold within a preset time 1, the terminal performs RLM/BFD measurement relaxation, or if the measurement result is lower than or equal to a second threshold, and no measurement result is higher than a first threshold within a preset time 2, the terminal performs normal RLM/BFD measurement;

2. if the measurement result is higher than or equal to a first threshold, and no measurement result is lower than a second threshold within a preset time 1, the terminal performs normal RLM/BFD measurement, or if the measurement result is lower than or equal to a second threshold, and no measurement result is higher than a first threshold within a preset time 2, the terminal performs RLM/BFD measurement enhancement; or 3. if the measurement result is higher than or equal to a first threshold, and no measurement result is lower than a second threshold within a preset time 1, the terminal performs RLM/BFD measurement relaxation, or if the measurement result is lower than or equal to a second threshold, and no measurement result is higher than a first threshold within a preset time 2, the terminal performs RLM/BFD measurement enhancement.

The first threshold or the second threshold in the foregoing 1, 2, and 3 may be the same or different, and may be specifically configured by the network.

Further, the first threshold and/or the second threshold may be the same as or different from an S-measure threshold defined in a protocol (threshold used in a connected state and an idle state to determine whether to measure neighboring cells or other frequencies).

In another solution, the information includes a preset timer or preset time or counter for the RLM/BFD measurement, and whether to perform an RLM/BFD measurement adjustment may be determined based on the following rule:

Method 1:

1. After a preset time after the terminal performs RLM/BFD measurement relaxation or measurement enhancement, the terminal automatically returns to normal RLM/BFD measurement; or when the terminal starts RLM/BFD measurement relaxation/enhancement, a timer is started, and when the timer expires, the terminal returns to normal RLM/BFD measurement.

Method 2:

1. After a preset quantity of measurement periods or measurement samples after the terminal performs RLM/BFD measurement relaxation or measurement enhancement, the terminal automatically returns to normal RLM/BFD measurement; or when the terminal starts RLM/BFD measurement relaxation/enhancement, a counter is started, and 1 is added to the counter for every measurement period or measurement sample, and when a preset count is reached, the terminal returns to normal RLM/BFD measurement.

In another solution, the information includes an RLM/BFD measurement adjustment determining threshold and a preset time, and whether to perform an RLM/BFD measurement adjustment may be determined based on the following rule:

Method 1:

If a measurement result change is lower than or equal to a first threshold within a preset time 1, the terminal performs RLM/BFD measurement relaxation, or when a measurement result change is always higher than or equal to a second threshold within a preset time 2, the terminal performs the RLM/BFD normal measurement;

if a measurement result change is lower than or equal to a first threshold within a preset time 1, the terminal performs normal RLM/BFD measurement, or when a measurement result change is higher than or equal to a second threshold within a preset time 2, the terminal performs RLM/BFD measurement enhancement; or if a measurement result change is lower than or equal to a first threshold within a preset time 1, the terminal performs RLM/BFD measurement relaxation, or when a measurement result change is higher than or equal to a second threshold within a preset time 2, the terminal performs RLM/BFD measurement enhancement.

Method 2:

If a measurement result change is lower than or equal to a first threshold within a preset time 1, the terminal performs RLM/BFD measurement relaxation, or when a measurement result change is always higher than or equal to a second threshold within a preset time 2, the terminal performs the RLM/BFD normal measurement;

if a measurement result change is lower than or equal to a first threshold within a preset time 1, the terminal performs normal RLM/BFD measurement, or when a measurement result change is higher than or equal to a second threshold within a preset time 2, the terminal performs RLM/BFD measurement enhancement; or if a measurement result change is lower than or equal to a first threshold within a preset time 1, the terminal performs RLM/BFD measurement relaxation, or when a measurement result change is higher than or equal to a second threshold within a preset time 2, the terminal performs RLM/BFD measurement enhancement.

Method 3:

If a measurement result change is lower than or equal to a first threshold within a preset time 1, and no measurement result change is higher than or equal to the second threshold within the preset time 2, the terminal performs RLM/BFD measurement relaxation, or when a measurement result change is higher than or equal to a first threshold within a preset time 1, and no measurement result change is lower than or equal to the first threshold within the preset time 1, the terminal performs normal RLM/BFD measurement;

if a measurement result change is lower than or equal to a first threshold within a preset time 1, and no measurement result change is higher than or equal to the second threshold within the preset time 2, the terminal performs normal RLM/BFD measurement, or when a measurement result change is higher than or equal to a first threshold within a preset time 1, and no measurement result change is lower than or equal to the first threshold within the preset time 1, the terminal performs RLM/BFD measurement enhancement; or if a measurement result change is lower than or equal to a first threshold within a preset time 1, and no measurement result change is higher than or equal to the second threshold within the preset time 2, the terminal performs RLM/BFD measurement relaxation, or when a measurement result change is higher than or equal to a first threshold within a preset time 1, and no measurement result change is lower than or equal to the first threshold within the preset time 1, the terminal performs RLM/BFD measurement enhancement.

The first threshold or the second threshold in the foregoing 1, 2, and 3 may be the same or different, and may be specifically configured by the network.

Further, the first threshold and/or the second threshold may be the same as or different from an S-measure threshold defined in a protocol (threshold used in a connected state and an idle state to determine whether to measure neighboring cells or other frequencies).

In an optional implementation, before the receiving an indication message, the method further includes:

sending a request message to a network device, where the request message includes at least one of the following:

a measurement state that the measurement is requested to be adjusted to and a parameter of the measurement requested to be adjusted, where the measurement state that the measurement is requested to be adjusted to includes at least one of the following:

the first measurement state, the second measurement state, and the third measurement state.

The measurement state that the measurement is requested to be adjusted to may be a measurement state that the terminal expects to adjust the measurement state to before receiving the indication message. It should be noted that, when the measurement state that the measurement is requested to be adjusted to includes more than one of the first measurement state, the second measurement state, and the third measurement state, the terminal may expect to adjust the measurement state to any one of the more than one of the first measurement state, the second measurement state, and the third measurement state. For example, if the measurement state that the measurement is requested to be adjusted to includes the first measurement state and the second measurement state, it indicates that the terminal expects to adjust the measurement state to either of the first measurement state and the second measurement state, so that the network device further configures the terminal to specifically adjust the measurement state to a measurement state. Alternatively, when the measurement state that the measurement is requested to be adjusted to includes more than one of the first measurement state, the second measurement state, and the third measurement state, the measurement state may be a measurement state requested in a plurality of beams, carriers, BWPs, or frequency bands. For example, a measurement state requested in a beam 1 is the first measurement state, a measurement state requested in a beam 2 is the third measurement state, and a measurement state requested in the beam 3 is the second measurement state.

Optionally, the parameter of the measurement requested to be adjusted includes at least one of the following:

a measurement period, an upper layer indication period, a threshold associated with the measurement, and duration associated with the measurement.

The measurement period may be a period of the RLM measurement or the BFD measurement.

The threshold associated with the measurement may be a threshold of a counter or a timer associated with RLM and BFD measurements, such as T310, T311, N310, and N311.

The duration associated with the measurement may be duration of the measurement adjustment, such as the first time, second time, third time, fourth time, fifth time, or sixth time described in the foregoing implementation, or may be duration of the adjusted measurement state.

In this implementation, by using the measurement state that the measurement is requested to be adjusted to and the parameter of the measurement requested to be adjusted, the network device can be notified of the measurement state that the terminal expects to adjust the measurement state to and the parameter expected to be adjusted, so that the network device and the terminal can perform a measurement state negotiation, to improve the measurement capability of the terminal. For example, the network device allows the terminal to adjust the measurement state, or the network device further optimizes the parameter for measurement adjustment.

In an optional implementation, the measurement includes at least one of the following:

a current cell measurement, a neighboring cell measurement, an inter-frequency measurement (Inter-frequency measurement), and an inter-system measurement (Inter-RAT measurement).

The current cell measurement can adjust a measurement state of the current cell measurement, the neighboring cell measurement can adjust a measurement state of the neighboring cell measurement, the inter-frequency measurement can adjust a measurement state of the inter-frequency measurement, and the inter-system measurement can adjust a measurement state of the inter-system measurement. Further, the neighboring cell measurement may include an intra-frequency neighboring cell measurement, other frequency measurements, and other RAT measurements.

For example, when there is a neighboring cell RLM/BFD measurement, whether to adjust the measurement state of the RLM/BFD measurement of at least one of the current cell and the neighboring cell may be determined based on the foregoing information. When there is no neighboring cell RLM/BFD measurement, whether to adjust the measurement state of the RLM/BFD measurement of the current cell is determined based on the foregoing information.

In this embodiment of the present invention, the indication message is received, where the indication message is used to indicate the information about the measurement adjustment, and the measurement includes at least one of the RLM measurement or the BFD measurement; and whether to adjust the measurement state of the measurement is determined based on the information. In this way, the terminal can be supported in adjusting the measurement state, thereby improving the measurement capability of the terminal.

Figure 3:
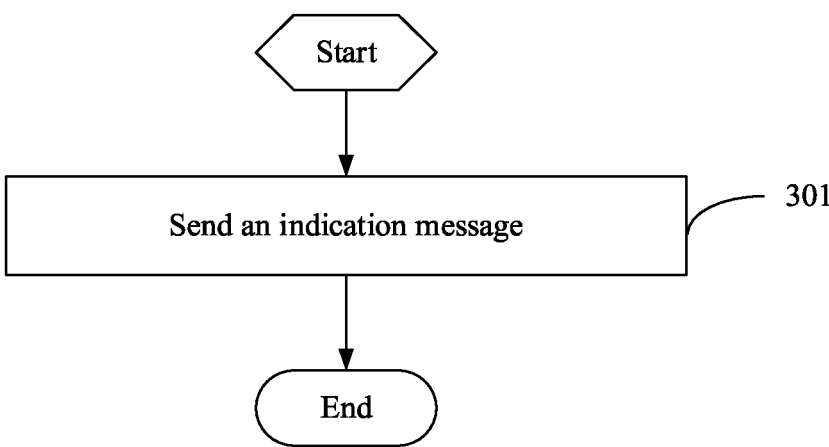
FIG. 3 is a flowchart of an indication information sending method according to an embodiment of the present invention.

FIG. 3 is a flowchart of an indication information sending method according to an embodiment of the present invention. The method is applied to a network device. As shown in FIG. 3, the method includes the following steps.

Step 301: Send an indication message, where the indication message is used to indicate information about adjustment of a measurement, the measurement includes at least one of an RLM measurement or a BFD measurement, and the information is used to cause a terminal to determine whether to adjust a measurement state of the measurement.

Optionally, the adjusting a measurement state of the measurement includes making an adjustment between any two of the following measurement states:

a first measurement state, a second measurement state, and a third measurement state, where the first measurement state is measurement relaxation, the second measurement state is normal measurement, and the third measurement state is measurement enhancement.

Optionally, the first measurement state satisfies at least one of the following:

a measurement period is longer than a measurement period of the second measurement state;

a quantity of measurement samples within a first time is less than a quantity of measurement samples in the second measurement state;

a measurement indication gap is longer than a measurement indication gap of the second measurement state;

the measurement is not performed within a second time, or a quantity of measurements within the second time is less than a quantity of measurements in the second measurement state;

no upper layer indication of the measurement is provided within a third time, or a quantity of upper layer indications of the measurement within the third time is less than a quantity of upper layer indications of the measurement in the second measurement state;

a quantity of reference signals of the measurement is less than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the third measurement state satisfies at least one of the following:

a measurement period is shorter than a measurement period of the second measurement state;

a quantity of measurement samples within a fourth time is greater than a quantity of measurement samples in the second measurement state;

a measurement indication gap is shorter than a measurement indication gap of the second measurement state;

the measurement is performed within a fifth time, or a quantity of measurements within the fifth time is greater than a quantity of measurements in the second measurement state;

an upper layer indication of the measurement is provided within a sixth time, or a quantity of upper layer indications of the measurement within the sixth time is greater than a quantity of upper layer indications of the measurement in the second measurement state;

a quantity of reference signals of the measurement is greater than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the information is used to represent at least one of the following:

a measurement state parameter, a measurement state supported by a cell, and a cell type; or the information is used to represent at least one of the following:

a measurement state parameter, whether a cell supports the first measurement state, whether a cell supports the third measurement state, and a cell type; or the information is used to represent at least one of the following:

a measurement state parameter, a supported measurement state, a first indication, a second indication, and a third indication; or the information is used to represent at least one of the following:

a measurement state parameter, whether the first measurement state is supported, whether the third measurement state is supported, a first indication, a second indication, and a third indication, where the first indication is used to indicate skipping the measurement corresponding to at least one period, the second indication is used to indicate performing the measurement in at least one period after the indication message, and the period includes a measurement period, a discontinuous reception DRX cycle, or an upper layer indication period; and the third indication is used to indicate skipping at least one upper layer indication period.

Optionally, the indication message indicates the information explicitly or implicitly.

Optionally, the indication message explicitly indicates the information by using at least one bit; or the indication message implicitly indicates the information by indicating skipping physical downlink control channel PDCCH monitoring or not starting a DRX-on duration timer.

Optionally, the indication message includes system information or an advance indication message.

Optionally, before the sending an indication message, the method further includes:

receiving a request message, where the request message includes at least one of the following:

a measurement state that the measurement is requested to be adjusted to and a parameter of the measurement requested to be adjusted, where the measurement state that the measurement is requested to be adjusted to includes at least one of the following:

the first measurement state, the second measurement state, and the third measurement state.

Optionally, the parameter of the measurement requested to be adjusted includes at least one of the following:

a measurement period, an upper layer indication period, a threshold associated with the measurement, and duration associated with the measurement.

Optionally, the information includes one of the following:

information configured by a network device for each terminal;

information configured by a network device for each cell;

information configured by a network device for each frequency, each carrier, each frequency band, or each bandwidth part;

information configured by a network device for each frequency, each carrier, each frequency band, or each bandwidth part of each terminal; and information configured by a network device for each beam.

Optionally, the measurement includes at least one of the following:

a current cell measurement, a neighboring cell measurement, an inter-frequency measurement, and an inter-system measurement.

It should be noted that this embodiment is used as an implementation of the network device side corresponding to the embodiment shown in FIG. 2. For a specific implementation of this embodiment, reference may be made to the related descriptions of the embodiment shown in FIG. 2. To avoid repetition, details are not described again in this embodiment. In this embodiment, a measurement capability of the terminal can also be improved.

Figure 4:
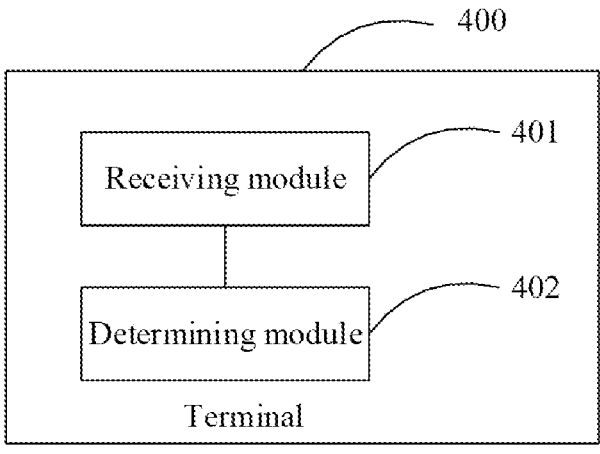
FIG. 4 is a structural diagram of a terminal according to an embodiment of the present invention.

FIG. 4 is a structural diagram of a terminal according to an embodiment of the present invention. As shown in FIG. 4, the terminal 400 includes:

a receiving module 401, configured to receive an indication message, where the indication message is used to indicate information about adjustment of a measurement, and the measurement includes at least one of a radio link monitoring RLM measurement or a beam failure detection BFD measurement; and a determining module 402, configured to determine, based on the information, whether to adjust a measurement state of the measurement.

Optionally, the adjusting a measurement state of the measurement includes making an adjustment between any two of the following measurement states:

a first measurement state, a second measurement state, and a third measurement state, where the first measurement state is measurement relaxation, the second measurement state is normal measurement, and the third measurement state is measurement enhancement.

Optionally, the first measurement state satisfies at least one of the following:

a measurement period is longer than a measurement period of the second measurement state;

a quantity of measurement samples within a first time is less than a quantity of measurement samples in the second measurement state;

a measurement indication gap is longer than a measurement indication gap of the second measurement state;

the measurement is not performed within a second time, or a quantity of measurements within the second time is less than a quantity of measurements in the second measurement state;

no upper layer indication of the measurement is provided within a third time, or a quantity of upper layer indications of the measurement within the third time is less than a quantity of upper layer indications of the measurement in the second measurement state;

a quantity of reference signals of the measurement is less than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the third measurement state satisfies at least one of the following:

a measurement period is shorter than a measurement period of the second measurement state;

a quantity of measurement samples within a fourth time is greater than a quantity of measurement samples in the second measurement state;

a measurement indication gap is shorter than a measurement indication gap of the second measurement state;

the measurement is performed within a fifth time, or a quantity of measurements within the fifth time is greater than a quantity of measurements in the second measurement state;

an upper layer indication of the measurement is provided within a sixth time, or a quantity of upper layer indications of the measurement within the sixth time is greater than a quantity of upper layer indications of the measurement in the second measurement state;

a quantity of reference signals of the measurement is greater than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the information is used to represent at least one of the following:

a measurement state parameter, a measurement state supported by a cell, and a cell type; or the information is used to represent at least one of the following:

a measurement state parameter, whether a cell supports the first measurement state, whether a cell supports the third measurement state, and a cell type; or the information is used to represent at least one of the following:

a measurement state parameter, a supported measurement state, a first indication, a second indication, and a third indication; or the information is used to represent at least one of the following:

a measurement state parameter, whether the first measurement state is supported, whether the third measurement state is supported, a first indication, a second indication, and a third indication, where the first indication is used to indicate skipping the measurement corresponding to at least one period, the second indication is used to indicate performing the measurement in at least one period after the indication message, and the period includes a measurement period, a discontinuous reception DRX cycle, or an upper layer indication period; and the third indication is used to indicate skipping at least one upper layer indication period.

Optionally, the indication message indicates the information explicitly or implicitly.

Optionally, the indication message explicitly indicates the information by using at least one bit; or the indication message implicitly indicates the information by indicating skipping physical downlink control channel PDCCH monitoring or not starting a DRX-on duration timer.

Optionally, the indication message includes system information or an advance indication message.

Optionally, the determining module 402 is configured to determine, based on the information and a parameter of the terminal, whether to adjust the measurement state of the measurement; or the determining module 402 is configured to determine, based on the information, a parameter of the terminal, and a cell type, whether to adjust the measurement state of the measurement; or the determining module 402 is configured to determine, based on the information and a cell type, whether to adjust the measurement state of the measurement, where the parameter of the terminal includes at least one of a moving speed and a location of the terminal.

Optionally, the at least one of the moving speed and the location of the terminal is determined based on a threshold configured by a network device and a measurement result of the terminal.

Optionally, a correspondence exists between the parameter of the terminal and the measurement state of the measurement; and a correspondence exists between the cell type and the measurement state of the measurement.

Figure 5:
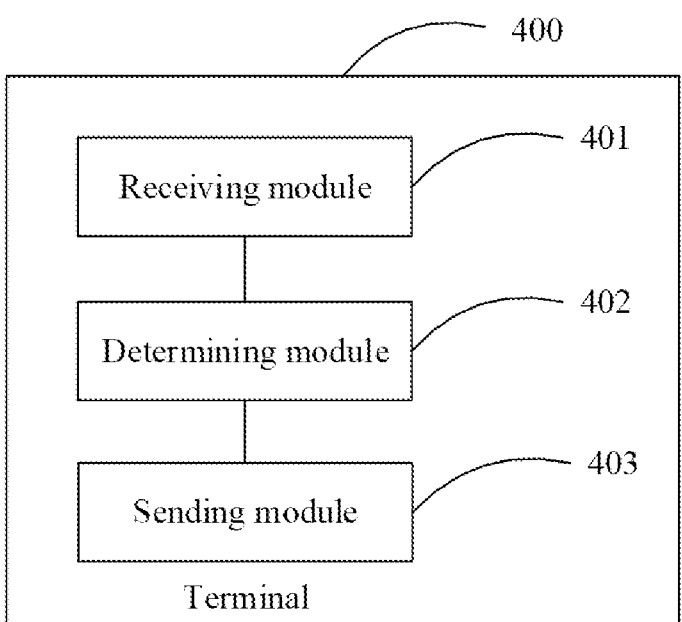
FIG. 5 is a structural diagram of another terminal according to an embodiment of the present invention.

Optionally, as shown in FIG. 5, the terminal 400 further includes:

a sending module 403, configured to send a request message to a network device, where the request message includes at least one of the following:

a measurement state that the measurement is requested to be adjusted to and a parameter of the measurement requested to be adjusted, where the measurement state that the measurement is requested to be adjusted to includes at least one of the following:

the first measurement state, the second measurement state, and the third measurement state.

Optionally, the parameter of the measurement requested to be adjusted includes at least one of the following:

a measurement period, an upper layer indication period, a threshold associated with the measurement, and duration associated with the measurement.

Optionally, the information includes one of the following:

information configured by a network device for each terminal;

information configured by a network device for each cell;

information configured by a network device for each frequency, each carrier, each frequency band, or each bandwidth part;

information configured by a network device for each frequency, each carrier, each frequency band, or each bandwidth part of each terminal; and information configured by a network device for each beam.

Optionally, the measurement includes at least one of the following:

a current cell measurement, a neighboring cell measurement, an inter-frequency measurement, and an inter-system measurement.

The terminal provided in this embodiment of the present invention is capable of implementing each process implemented by the terminal in the method embodiment in FIG. 2. To avoid repetition, details are not described herein again. In addition, a measurement capability of the terminal can be improved.

Figure 6:
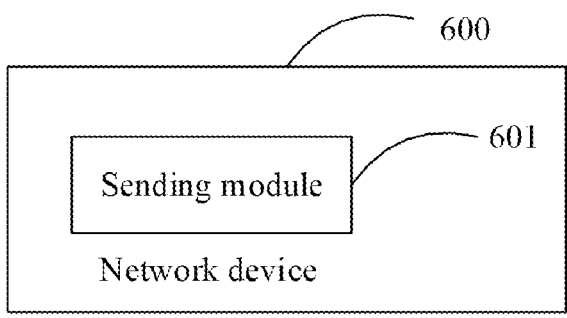
FIG. 6 is a structural diagram of a network device according to an embodiment of the present invention.
Figure 7:
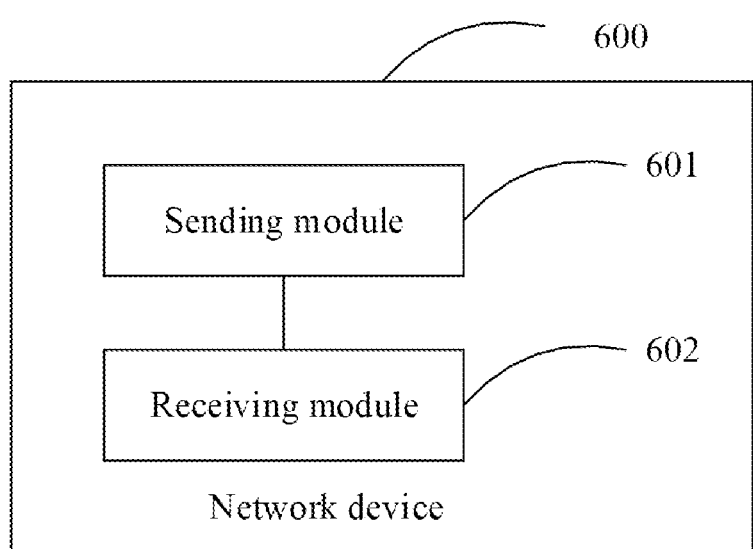
FIG. 7 is a structural diagram of another network device according to an embodiment of the present invention.

FIG. 6 is a structural diagram of a network device according to an embodiment of the present invention. As shown in FIG. 7, the network device 600 includes:

a sending module 601, configured to send an indication message, where the indication message is used to indicate information about adjustment of a measurement, the measurement includes at least one of a radio link monitoring RLM measurement or a beam failure detection BFD measurement, and the information is used to cause a terminal to determine whether to adjust a measurement state of the measurement.

Optionally, the adjusting a measurement state of the measurement includes making an adjustment between any two of the following measurement states:

a first measurement state, a second measurement state, and a third measurement state, where the first measurement state is measurement relaxation, the second measurement state is normal measurement, and the third measurement state is measurement enhancement.

Optionally, the first measurement state satisfies at least one of the following:

a measurement period is longer than a measurement period of the second measurement state;

a quantity of measurement samples within a first time is less than a quantity of measurement samples in the second measurement state;

a measurement indication gap is longer than a measurement indication gap of the second measurement state;

the measurement is not performed within a second time, or a quantity of measurements within the second time is less than a quantity of measurements in the second measurement state;

no upper layer indication of the measurement is provided within a third time, or a quantity of upper layer indications of the measurement within the third time is less than a quantity of upper layer indications of the measurement in the second measurement state;

a quantity of reference signals of the measurement is less than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the third measurement state satisfies at least one of the following:

a measurement period is shorter than a measurement period of the second measurement state;

a quantity of measurement samples within a fourth time is greater than a quantity of measurement samples in the second measurement state;

a measurement indication gap is shorter than a measurement indication gap of the second measurement state;

the measurement is performed within a fifth time, or a quantity of measurements within the fifth time is greater than a quantity of measurements in the second measurement state;

an upper layer indication of the measurement is provided within a sixth time, or a quantity of upper layer indications of the measurement within the sixth time is greater than a quantity of upper layer indications of the measurement in the second measurement state;

a quantity of reference signals of the measurement is greater than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the information is used to represent at least one of the following:

a measurement state parameter, a measurement state supported by a cell, and a cell type; or the information is used to represent at least one of the following:

a measurement state parameter, whether a cell supports the first measurement state, whether a cell supports the third measurement state, and a cell type; or the information is used to represent at least one of the following:

a measurement state parameter, a supported measurement state, a first indication, a second indication, and a third indication; or the information is used to represent at least one of the following:

a measurement state parameter, whether the first measurement state is supported, whether the third measurement state is supported, a first indication, a second indication, and a third indication, where the first indication is used to indicate skipping the measurement corresponding to at least one period, the second indication is used to indicate performing the measurement in at least one period after the indication message, and the period includes a measurement period, a discontinuous reception DRX cycle, or an upper layer indication period; and the third indication is used to indicate skipping at least one upper layer indication period.

Optionally, the indication message indicates the information explicitly or implicitly.

Optionally, the indication message explicitly indicates the information by using at least one bit; or the indication message implicitly indicates the information by indicating skipping physical downlink control channel PDCCH monitoring or not starting a DRX-on duration timer.

Optionally, the indication message includes system information or an advance indication message.

Optionally, as shown in FIG. 7, the network device 600 further includes:

a receiving module 602, configured to receive a request message, where the request message includes at least one of the following:

a measurement state that the measurement is requested to be adjusted to and a parameter of the measurement requested to be adjusted, where the measurement state that the measurement is requested to be adjusted to includes at least one of the following: the first measurement state, the second measurement state, and the third measurement state.

Optionally, the parameter of the measurement requested to be adjusted includes at least one of the following:

a measurement period, an upper layer indication period, a threshold associated with the measurement, and duration associated with the measurement.

Optionally, the information includes one of the following:

information configured by a network device for each terminal;

information configured by a network device for each cell;

information configured by a network device for each frequency, each carrier, each frequency band, or each bandwidth part;

information configured by a network device for each frequency, each carrier, each frequency band, or each bandwidth part of each terminal; and information configured by a network device for each beam.

Optionally, the measurement includes at least one of the following:

a current cell measurement, a neighboring cell measurement, an inter-frequency measurement, and an inter-system measurement.

The network device provided in this embodiment of the present invention is capable of implementing each process implemented by the network device in the method embodiment in FIG. 3. To avoid repetition, details are not described herein again. In addition, a measurement capability of the terminal can be improved.

Figure 8:
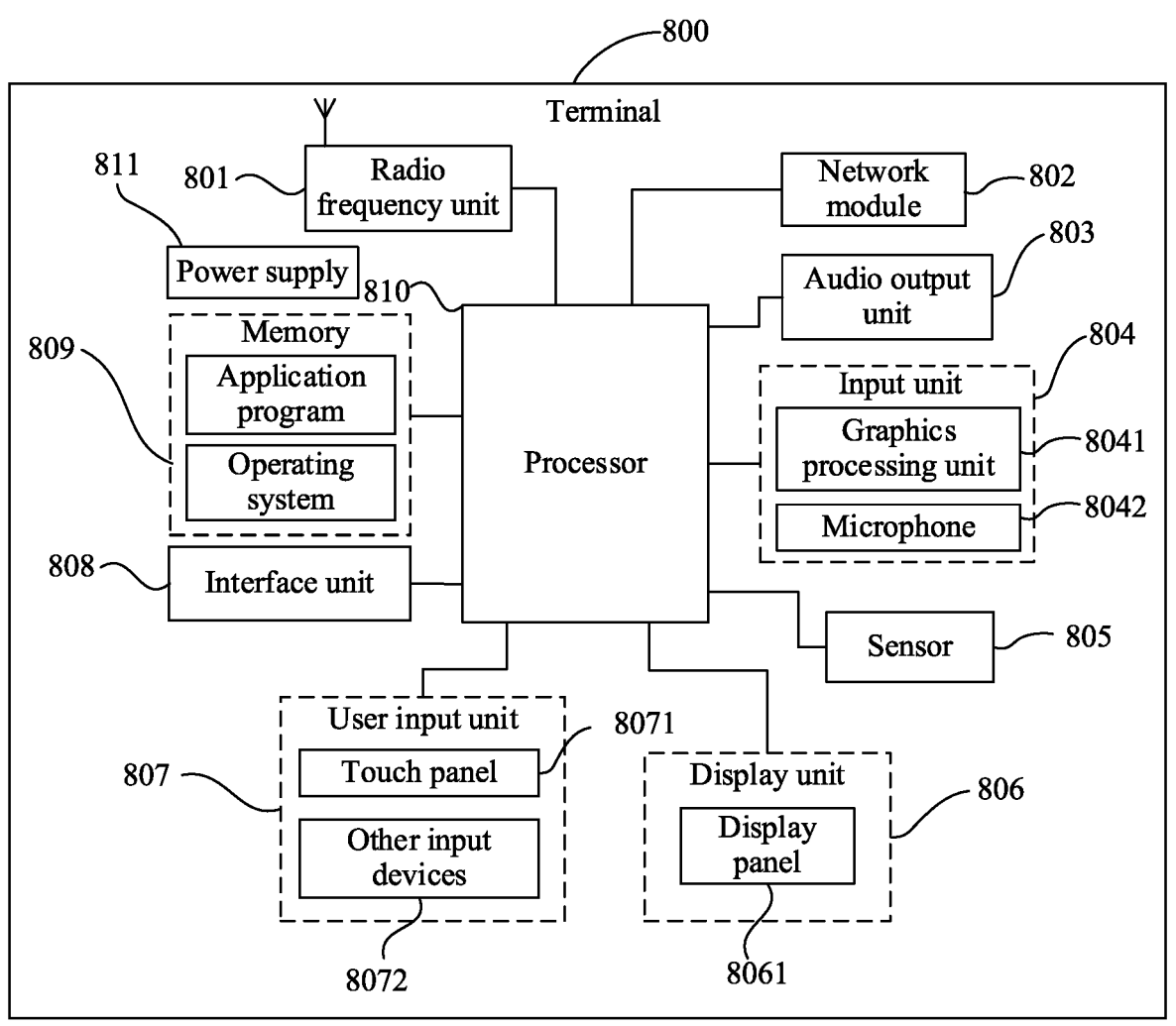
FIG. 8 is a structural diagram of another terminal according to an embodiment of the present invention.

FIG. 8 is a schematic diagram of a hardware structure of a terminal for implementing the embodiments of the present invention.

The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal shown in FIG. 8 does not constitute any limitation on the terminal device. The terminal may include more or fewer components than shown in the figure, or have some of the components combined, or have different arrangements of the components. In this embodiment of the present invention, the terminal includes but is not limited to a mobile phone, a tablet computer, a notebook computer, a palmtop computer, a vehicle-mounted terminal, a robot, a wearable device, a pedometer, or the like.

The radio frequency unit 801 is configured to receive an indication message, where the indication message is used to indicate information about adjustment of a measurement, and the measurement includes at least one of a radio link monitoring RLM measurement or a beam failure detection BFD measurement.

The processor 810 is configured to determine, based on the information, whether to adjust a measurement state of the measurement.

Optionally, the adjusting a measurement state of the measurement includes making an adjustment between any two of the following measurement states:

a first measurement state, a second measurement state, and a third measurement state, where the first measurement state is measurement relaxation, the second measurement state is normal measurement, and the third measurement state is measurement enhancement.

Optionally, the first measurement state satisfies at least one of the following:

a measurement period is longer than a measurement period of the second measurement state;

a quantity of measurement samples within a first time is less than a quantity of measurement samples in the second measurement state;

a measurement indication gap is longer than a measurement indication gap of the second measurement state;

the measurement is not performed within a second time, or a quantity of measurements within the second time is less than a quantity of measurements in the second measurement state;

no upper layer indication of the measurement is provided within a third time, or a quantity of upper layer indications of the measurement within the third time is less than a quantity of upper layer indications of the measurement in the second measurement state;

a quantity of reference signals of the measurement is less than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the third measurement state satisfies at least one of the following:

a measurement period is shorter than a measurement period of the second measurement state;

a quantity of measurement samples within a fourth time is greater than a quantity of measurement samples in the second measurement state;

a measurement indication gap is shorter than a measurement indication gap of the second measurement state;

the measurement is performed within a fifth time, or a quantity of measurements within the fifth time is greater than a quantity of measurements in the second measurement state;

an upper layer indication of the measurement is provided within a sixth time, or a quantity of upper layer indications of the measurement within the sixth time is greater than a quantity of upper layer indications of the measurement in the second measurement state;

a quantity of reference signals of the measurement is greater than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the information is used to represent at least one of the following:

a measurement state parameter, a measurement state supported by a cell, and a cell type; or the information is used to represent at least one of the following:

a measurement state parameter, whether a cell supports the first measurement state, whether a cell supports the third measurement state, and a cell type; or the information is used to represent at least one of the following:

a measurement state parameter, a supported measurement state, a first indication, a second indication, and a third indication; or the information is used to represent at least one of the following:

a measurement state parameter, whether the first measurement state is supported, whether the third measurement state is supported, a first indication, a second indication, and a third indication, where the first indication is used to indicate skipping the measurement corresponding to at least one period, the second indication is used to indicate performing the measurement in at least one period after the indication message, and the period includes a measurement period, a discontinuous reception DRX cycle, or an upper layer indication period; and the third indication is used to indicate skipping at least one upper layer indication period.

Optionally, the indication message indicates the information explicitly or implicitly.

Optionally, the indication message explicitly indicates the information by using at least one bit; or the indication message implicitly indicates the information by indicating skipping physical downlink control channel PDCCH monitoring or not starting a DRX-on duration timer.

Optionally, the indication message includes system information or an advance indication message.

Optionally, the determining, based on the information, whether to adjust a measurement state of the measurement includes:

determining, based on the information and a parameter of the terminal, whether to adjust the measurement state of the measurement; or determining, based on the information, a parameter of the terminal, and a cell type, whether to adjust the measurement state of the measurement; or determining, based on the information and a cell type, whether to adjust the measurement state of the measurement, where the parameter of the terminal includes at least one of a moving speed and a location of the terminal.

Optionally, the at least one of the moving speed and the location of the terminal is determined based on a threshold configured by a network device and a measurement result of the terminal.

Optionally, a correspondence exists between the parameter of the terminal and the measurement state of the measurement; and a correspondence exists between the cell type and the measurement state of the measurement.

Optionally, before receiving the indication message, the radio frequency unit 801 is further configured to:

send a request message to a network device, where the request message includes at least one of the following:

a measurement state that the measurement is requested to be adjusted to and a parameter of the measurement requested to be adjusted, where the measurement state that the measurement is requested to be adjusted to includes at least one of the following:

the first measurement state, the second measurement state, and the third measurement state.

Optionally, the parameter of the measurement requested to be adjusted includes at least one of the following:

a measurement period, an upper layer indication period, a threshold associated with the measurement, and duration associated with the measurement.

Optionally, the information includes one of the following:

information configured by a network device for each terminal;

information configured by a network device for each cell;

information configured by a network device for each frequency, each carrier, each frequency band, or each bandwidth part;

information configured by a network device for each frequency, each carrier, each frequency band, or each bandwidth part of each terminal; and information configured by a network device for each beam.

Optionally, the measurement includes at least one of the following:

a current cell measurement, a neighboring cell measurement, an inter-frequency measurement, and an inter-system measurement.

It should be understood that in this embodiment of the present invention, the radio frequency unit 801 may be configured to receive and send signals in an information reception or transmission or call process. Specifically, after receiving downlink data from a base station, the radio frequency unit 801 sends the downlink data to the processor 810 for processing, and in addition, sends uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may also communicate with a network and other devices via a wireless communications system.

The terminal provides wireless broadband Internet access for a user by using the network module 802, for example, helps the user send and receive e-mails, browse web pages, and access streaming media.

The audio output unit 803 may convert audio data received by the radio frequency unit 801 or the network module 802 or stored in the memory 809 into an audio signal and output the audio signal as a sound. Furthermore, the audio output unit 803 may also provide audio output (for example, a call signal received sound or a message received sound) related to a specific function performed by the terminal 800. The audio output unit 803 includes a speaker, a buzzer, a receiver, and the like.

The input unit 804 is configured to receive an audio or video signal. The input unit 804 may include a graphics processing unit (Graphics Processing Unit, GPU) 8041 and a microphone 8042. The graphics processing unit 8041 processes image data of a still picture or video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or be sent by the radio frequency unit 801 or the network module 802. The microphone 8042 is capable of receiving sounds and processing such sounds into audio data. The processed audio data can be converted into a format output that can be sent to a mobile communication base station through the radio frequency unit 801 in a telephone call mode.

The terminal 800 further includes at least one sensor 805, for example, an optical sensor, a motion sensor, and other sensors. Specifically, the optical sensor includes an ambient light sensor and a proximity sensor. The ambient light sensor may adjust luminance of the display panel 8061 based on brightness of ambient light, and the proximity sensor may turn off the display panel 8061 and/or backlight when the terminal 800 moves close to an ear. As a type of motion sensor, an accelerometer sensor can detect magnitudes of accelerations in all directions (usually three axes), can detect a magnitude and a direction of gravity when the terminal is in a static state, and can be applied to terminal posture recognition (such as screen switching between portrait and landscape, related games, and magnetometer posture calibration), functions related to vibration recognition (such as pedometer and tapping), and the like. The sensor 805 may also include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by the user or information provided to the user. The display unit 806 may include a display panel 8061, and the display panel 8061 may be configured in a form of a liquid crystal display (Liquid Crystal Display, LCD), an organic light-emitting diode (Organic Light-Emitting Diode, OLED), or the like.

The user input unit 807 may be configured to receive input digit or character information and generate key signal input related to user setting and function control of the terminal. Specifically, the user input unit 807 includes a touch panel 8071 and other input devices 8072. The touch panel 8071 is also referred to as a touchscreen and can collect a touch operation (such as an operation performed by the user on the touch panel 8071 or near the touch panel 8071 with a finger or by using any proper object or accessory such as a stylus) of the user on or near the touch panel 8071. The touch panel 8071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touchpoint coordinates, and sends the touchpoint coordinates to the processor 810, and receives and executes a command sent by the processor 810. In addition, the touch panel 8071 may be implemented in a plurality of forms, for example, as a resistive, capacitive, infrared, or surface acoustic wave touch panel. The user input unit 807 may further include the other input devices 8072 in addition to the touch panel 8071. Specifically, the other input devices 8072 may include but are not limited to a physical keyboard, a function key (such as a volume control key or a power on/off key), a trackball, a mouse, and a joystick. Details are not described herein.

Further, the touch panel 8071 may cover the display panel 8061. When detecting a touch operation on or near the touch panel 8071, the touch panel 8071 transmits the touch operation to the processor 810 to determine a type of the touch event. Then, the processor 810 provides a corresponding visual output on the display panel 8061 based on the type of the touch event. Although in FIG. 8, the touch panel 8071 and the display panel 8061 act as two separate parts to implement input and output functions of the terminal, in some embodiments, the touch panel 8071 and the display panel 8061 may be integrated to implement the input and output functions of the terminal. This is not specifically limited herein.

The interface unit 808 is an interface for connecting an external apparatus to the terminal 800. For example, the external apparatus may include a wired or wireless headset port, an external power supply (or battery charger) port, a wired or wireless data port, a memory port, a port for connecting an apparatus with an identification module, an audio input/output (I/O) port, a video I/O port, an earphone port, and the like. The interface unit 808 may be configured to receive an input (for example, data information or power) from an external apparatus and transmit the received input to one or more elements within the terminal 800, or may be configured to transmit data between the terminal 800 and the external apparatus.

The memory 809 may be configured to store software programs and various data. The memory 809 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 809 may include a high-speed random access memory, and may further include a non-volatile memory, for example, as at least one disk storage device, flash memory device, or other volatile solid-state storage device.

The processor 810 is a control center of the terminal, which is connected to all components of the terminal by using various interfaces and lines. By running or executing software programs and/or modules that are stored in the memory 809 and calling data stored in the memory 809, the processor 810 executes various functions of the terminal and processes data, so as to perform overall monitoring on the terminal. The processor 810 may include one or more processing units. Preferably, the processor 810 may integrate an application processor and a modem processor. The application processor mainly processes the operating system, a user interface, an application program, and the like. The modem processor mainly processes wireless communication. It can be understood that the modem processor may alternatively not be integrated in the processor 810.

The terminal 800 may further include the power supply 811 (for example, a battery) supplying power to the components. Preferably, the power supply 811 may be logically connected to the processor 810 through a power management system, so that functions such as charge and discharge management and power consumption management are implemented through the power management system.

In addition, the terminal 800 includes some functional modules that are not shown. Details are not described herein.

Preferably, an embodiment of the present invention further provides a terminal, including a processor 810, a memory 809, and a computer program stored in the memory 809 and capable of running on the processor 810. When the computer program is executed by the processor 810, the processes of the foregoing embodiment of the measurement processing method are implemented, with the same technical effect achieved. To avoid repetition, details are not described herein again.

Figure 9:
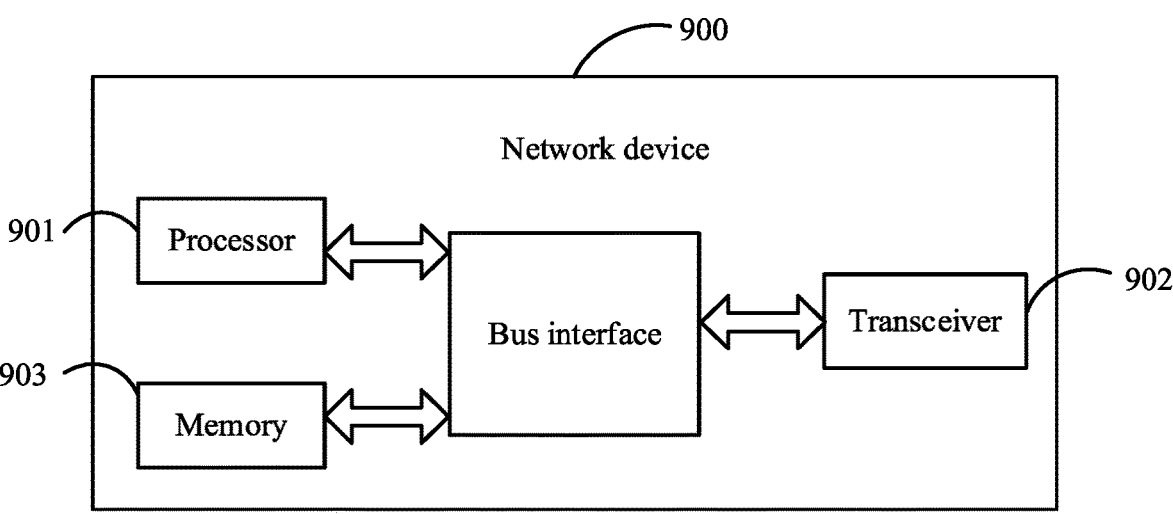
FIG. 9 is a structural diagram of another network device according to an embodiment of the present invention.

FIG. 9 is a structural diagram of another network device according to an embodiment of the present invention. As shown in FIG. 9, the network device 900 includes a processor 901, a transceiver 902, a memory 903, and a bus interface.

The transceiver 902 is configured to send an indication message, where the indication message is used to indicate information about adjustment of a measurement, the measurement includes at least one of a radio link monitoring RLM measurement or a beam failure detection BFD measurement, and the information is used to cause a terminal to determine whether to adjust a measurement state of the measurement.

Optionally, the adjusting a measurement state of the measurement includes making an adjustment between any two of the following measurement states:

a first measurement state, a second measurement state, and a third measurement state, where the first measurement state is measurement relaxation, the second measurement state is normal measurement, and the third measurement state is measurement enhancement.

Optionally, the first measurement state satisfies at least one of the following:

a measurement period is longer than a measurement period of the second measurement state;

a quantity of measurement samples within a first time is less than a quantity of measurement samples in the second measurement state;

a measurement indication gap is longer than a measurement indication gap of the second measurement state;

the measurement is not performed within a second time, or a quantity of measurements within the second time is less than a quantity of measurements in the second measurement state;

no upper layer indication of the measurement is provided within a third time, or a quantity of upper layer indications of the measurement within the third time is less than a quantity of upper layer indications of the measurement in the second measurement state;

a quantity of reference signals of the measurement is less than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the third measurement state satisfies at least one of the following:

a measurement period is shorter than a measurement period of the second measurement state;

a quantity of measurement samples within a fourth time is greater than a quantity of measurement samples in the second measurement state;

a measurement indication gap is shorter than a measurement indication gap of the second measurement state;

the measurement is performed within a fifth time, or a quantity of measurements within the fifth time is greater than a quantity of measurements in the second measurement state;

an upper layer indication of the measurement is provided within a sixth time, or a quantity of upper layer indications of the measurement within the sixth time is greater than a quantity of upper layer indications of the measurement in the second measurement state;

a quantity of reference signals of the measurement is greater than a quantity of reference signals of the measurement in the second measurement state; and a reference signal of the measurement is different from a reference signal of the measurement in the second measurement state, where the reference signals being different includes that the reference signals are different in at least one of periodicity and subcarrier spacing.

Optionally, the information is used to represent at least one of the following:

a measurement state parameter, a measurement state supported by a cell, and a cell type; or the information is used to represent at least one of the following:

a measurement state parameter, whether a cell supports the first measurement state, whether a cell supports the third measurement state, and a cell type; or the information is used to represent at least one of the following:

a measurement state parameter, a supported measurement state, a first indication, a second indication, and a third indication; or the information is used to represent at least one of the following:

a measurement state parameter, whether the first measurement state is supported, whether the third measurement state is supported, a first indication, a second indication, and a third indication, where the first indication is used to indicate skipping the measurement corresponding to at least one period, the second indication is used to indicate performing the measurement in at least one period after the indication message, and the period includes a measurement period, a discontinuous reception DRX cycle, or an upper layer indication period; and the third indication is used to indicate skipping at least one upper layer indication period.

Optionally, the indication message indicates the information explicitly or implicitly.

Optionally, the indication message explicitly indicates the information by using at least one bit; or the indication message implicitly indicates the information by indicating skipping physical downlink control channel PDCCH monitoring or not starting a DRX-on duration timer.

Optionally, the indication message includes system information or an advance indication message.

Optionally, before sending the indication message, the transceiver 902 is further configured to:

receive a request message, where the request message includes at least one of the following:

a measurement state that the measurement is requested to be adjusted to and a parameter of the measurement requested to be adjusted, where the measurement state that the measurement is requested to be adjusted to includes at least one of the following: the first measurement state, the second measurement state, and the third measurement state.

Optionally, the parameter of the measurement requested to be adjusted includes at least one of the following:

a measurement period, an upper layer indication period, a threshold associated with the measurement, and duration associated with the measurement.

Optionally, the information includes one of the following:

information configured by a network device for each terminal;

information configured by a network device for each cell;

information configured by a network device for each frequency, each carrier, each frequency band, or each bandwidth part;

information configured by a network device for each frequency, each carrier, each frequency band, or each bandwidth part of each terminal; and information configured by a network device for each beam.

Optionally, the measurement includes at least one of the following:

a current cell measurement, a neighboring cell measurement, an inter-frequency measurement, and an inter-system measurement.

The network device can improve a measurement capability of the terminal.

The transceiver 902 is configured to receive and send data under control of the processor 901. The transceiver 902 includes at least two antenna ports.

In FIG. 9, a bus architecture may include any quantity of interconnected buses and bridges, and specifically connects together circuits that are of one or more processors represented by the processor 901 and of a memory represented by the memory 903. The bus architecture may further interconnect various other circuits such as a peripheral device, a voltage regulator, and a power management circuit. These are all well known in the art, and therefore are not further described in this specification. The bus interface provides an interface. The transceiver 902 may be a plurality of components, including a transmitter and a receiver, and provides units for communicating with a variety of other apparatuses on a transmission medium. For different user equipments, the user interface 904 may also be an interface that can be externally or internally connected to a required device. The connected device includes but is not limited to a keypad, a display, a speaker, a microphone, a joystick, and the like.

The processor 901 is responsible for management of the bus architecture and general processing, and the memory 903 is capable of storing data that is used by the processor 901 during operation.

Preferably, an embodiment of the present invention further provides a network device, including a processor 901, a memory 903, and a computer program stored in the memory 903 and capable of running on the processor 901. When the computer program is executed by the processor 901, the processes of the embodiment of the indication information sending method are implemented, with the same technical effect achieved. To avoid repetition, details are not described herein again.

An embodiment of the present invention further provides a computer-readable storage medium. The computer-readable storage medium stores a computer program, and when the computer program is executed by a processor, the measurement processing method provided in the embodiments of the present invention is implemented, or when the computer program is executed by a processor, the indication information sending method provided in the embodiments of the present invention is implemented, with the same technical effect achieved. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. Without more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may be alternatively implemented by using hardware. However, in most cases, the former is a preferred implementation. Based on such an understanding, the technical solutions of the present invention essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the embodiments. The embodiments are only illustrative rather than restrictive. Inspired by the present invention, a person of ordinary skill in the art can still derive a plurality of variations without departing from the essence of the present invention and the protection scope of the claims. All these variations shall fall within the protection of the present invention.

What is claimed is:

1. A measurement processing method, applied to a terminal and comprising:

receiving an indication message, wherein the indication message is used to indicate information about adjustment of a measurement, and the measurement comprises at least one of a radio link monitoring RLM measurement or a beam failure detection BFD measurement; and determining, based on the information about adjustment of a measurement, whether to adjust a measurement state of the measurement from a second measurement state into a first measurement state, or from a third measurement state into the first measurement state;

wherein the determining, based on the information about adjustment of a measurement, whether to adjust a measurement state of the measurement comprises:

determining, based on the information about adjustment of a measurement and a parameter of the terminal, whether to adjust the measurement state of the measurement from a second measurement state into a first measurement state, or from a third measurement state into the first measurement state, wherein the information about adjustment of a measurement is used to represent whether a cell supports the first measurement state, a measurement period of the first measurement state is longer than a measurement period of the second measurement state, and a measurement period of the second measurement state is longer than a measurement period of the third measurement state;

wherein the parameter of the terminal comprises at least one of a moving speed and a location of the terminal;

wherein the first measurement state is measurement relaxation, the second measurement state is normal measurement, and the third measurement state is measurement enhancement;

wherein the measurement comprises measurement for a current cell.

2. The method according to claim 1, wherein the first measurement state further satisfies at least one of the following:

a quantity of measurement samples within a first time is less than a quantity of measurement samples in the second measurement state;

a measurement indication gap is longer than a measurement indication gap of the second measurement state;

the measurement is not performed within a second time, or a quantity of measurements within the second time is less than a quantity of measurements in the second measurement state;

no upper layer indication of the measurement is provided within a third time, or a quantity of upper layer indications of the measurement within the third time is less than a quantity of upper layer indications of the measurement in the second measurement state;

a quantity of reference signals of the measurement is less than a quantity of reference signals of the measurement in the second measurement state; and a reference signal of the measurement is different from a reference signal of the measurement in the second measurement state, wherein the reference signals being different comprises that the reference signals are different in at least one of periodicity and subcarrier spacing.

3. The method according to claim 1, wherein the third measurement state further satisfies at least one of the following:

a quantity of measurement samples within a fourth time is greater than a quantity of measurement samples in the second measurement state;

a measurement indication gap is shorter than a measurement indication gap of the second measurement state;

the measurement is performed within a fifth time, or a quantity of measurements within the fifth time is greater than a quantity of measurements in the second measurement state;

an upper layer indication of the measurement is provided within a sixth time, or a quantity of upper layer indications of the measurement within the sixth time is greater than a quantity of upper layer indications of the measurement in the second measurement state;

a quantity of reference signals of the measurement is greater than a quantity of reference signals of the measurement in the second measurement state; and a reference signal of the measurement is different from a reference signal of the measurement in the second measurement state, wherein the reference signals being different comprises that the reference signals are different in at least one of periodicity and subcarrier spacing.

4. The method according to claim 1, wherein the information is further used to represent at least one of the following:

a measurement state parameter, whether a cell supports the third measurement state, and a cell type; or the information is used to represent at least one of the following:

a measurement state parameter, a supported measurement state, a first indication, a second indication, and a third indication; or the information is used to represent at least one of the following:

a measurement state parameter, whether the first measurement state is supported, whether the third measurement state is supported, a first indication, a second indication, and a third indication, wherein the first indication is used to indicate performing the measurement corresponding to at least one period, the second indication is used to indicate performing the measurement in at least one period after the indication message, and the period comprises a measurement period, a discontinuous reception DRX cycle, or an upper layer indication period; and the third indication is used to indicate skipping at least one upper layer indication period.

5. The method according to claim 1, wherein the indication message explicitly indicates the information by using at least one bit; or the indication message implicitly indicates the information by indicating skipping physical downlink control channel PDCCH monitoring or not starting a DRX-on duration timer.

6. The method according to claim 1, wherein the indication message comprises system information or an advance indication message.

7. The method according to claim 1, wherein the at least one of the moving speed and the location of the terminal is determined based on a threshold configured by a network device and a measurement result of the terminal.

8. The method according to claim 1, wherein a correspondence exists between the parameter of the terminal and the measurement state of the measurement.

9. The method according to claim 1, wherein before the receiving an indication message, the method further comprises:

sending a request message to a network device, wherein the request message comprises at least one of the following:

a measurement state that the measurement is requested to be adjusted to and a parameter of the measurement requested to be adjusted, wherein the measurement state that the measurement is requested to be adjusted to comprises at least one of the following:

the first measurement state, the second measurement state, and the third measurement state.

10. The method according to claim 9, wherein in a case that the request message comprises a parameter of the measurement requested to be adjusted, the parameter of the measurement requested to be adjusted comprises at least one of the following:

a measurement period, an upper layer indication period, a threshold associated with the measurement, and duration associated with the measurement.

11. The method according to claim 1, wherein the information comprises one of the following:

information configured by a network device for each terminal;

information configured by a network device for each cell;

information configured by a network device for each frequency, each carrier, each frequency band, or each bandwidth part;

information configured by a network device for each frequency, each carrier, each frequency band, or each bandwidth part of each terminal; and information configured by a network device for each beam.

12. A non-transitory computer-readable storage medium, wherein the non-transitory computer-readable storage medium stores a computer program, and when the computer program is executed by a processor, steps of the measurement processing method according to claim 1 are implemented.

13. An indication information sending method, applied to a network device and comprising:

sending an indication message, wherein the indication message is used to indicate information about adjustment of a measurement, the measurement comprises at least one of a radio link monitoring RLM measurement or a beam failure detection BFD measurement, and the information about adjustment of a measurement is used to cause a terminal to determine whether to adjust a measurement state of the measurement from a second measurement state into a first measurement state, or from a third measurement state into the first measurement state;

determine, based on the information about adjustment of a measurement and a parameter of the terminal, whether to adjust the measurement state of the measurement from a second measurement state into a first measurement state, or from a third measurement state into the first measurement state, wherein the information about adjustment of a measurement is used to represent whether a cell supports the first measurement state, a measurement period of the first measurement state is longer than a measurement period of the second measurement state, and a measurement period of the second measurement state is longer than a measurement period of the third measurement state;

wherein the parameter of the terminal comprises at least one of a moving speed and a location of the terminal;

wherein the first measurement state is measurement relaxation, the second measurement state is normal measurement, and the third measurement state is measurement enhancement;

wherein the measurement comprises measurement for a current cell.

14. A network device, comprising a memory, a processor, and a program stored in the memory and capable of running on the processor, wherein when the program is executed by the processor, steps of the indication information sending method according to claim 13 are implemented.

15. A terminal, comprising a memory, a processor, and a program stored in the memory and capable of running on the processor, wherein when the program is executed by the processor, the following steps are implemented:

receiving an indication message, wherein the indication message is used to indicate information about adjustment of a measurement, and the measurement comprises at least one of a radio link monitoring RLM measurement or a beam failure detection BFD measurement; and determining, based on the information about adjustment of a measurement, whether to adjust a measurement state of the measurement from a second measurement state into a first measurement state, or from a third measurement state into the first measurement state, wherein the information about adjustment of a measurement is used to represent whether a cell supports the first measurement state, a measurement period of the first measurement state is longer than a measurement period of the second measurement state, and a measurement period of the second measurement state is longer than a measurement period of the third measurement state;

wherein the determining, based on the information about adjustment of a measurement, whether to adjust a measurement state of the measurement comprises:

determining, based on the information and a parameter of the terminal, whether to adjust the measurement state of the measurement from a second measurement state into a first measurement state, or from a third measurement state into the first measurement state;

wherein the parameter of the terminal comprises at least one of a moving speed and a location of the terminal;

wherein the first measurement state is measurement relaxation, the second measurement state is normal measurement, and the third measurement state is measurement enhancement;

wherein the measurement comprises measurement for a current cell.

16. The terminal according to claim 15, wherein the first measurement state satisfies at least one of the following:

a quantity of measurement samples within a first time is less than a quantity of measurement samples in the second measurement state;

a measurement indication gap is longer than a measurement indication gap of the second measurement state;

the measurement is not performed within a second time, or a quantity of measurements within the second time is less than a quantity of measurements in the second measurement state;

no upper layer indication of the measurement is provided within a third time, or a quantity of upper layer indications of the measurement within the third time is less than a quantity of upper layer indications of the measurement in the second measurement state;

a quantity of reference signals of the measurement is less than a quantity of reference signals of the measurement in the second measurement state; and a reference signal of the measurement is different from a reference signal of the measurement in the second measurement state, wherein the reference signals being different comprises that the reference signals are different in at least one of periodicity and subcarrier spacing.

* * * * *